(12) United States Patent
West et al.

(10) Patent No.: US 6,279,859 B2
(45) Date of Patent: Aug. 28, 2001

(54) KEYBOARD PAD WITH REVERSIBLE MOUSE PAD

(75) Inventors: Daniel C. K. West, Grand Rapids; Richard N. Roslund, Jr., Jenison; Brian D. T. Alexander, Douglas, all of MI (US); Jim LeClair, Ontario (CA); Ron Vanderloo, Ontario (CA); David Tonizzo, Ontario (CA); Mihai L. Ola, Kitchener (CA)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 09/746,479

(22) Filed: Dec. 27, 2000

Related U.S. Application Data (63) Continuation of application No. 09/174,000, filed on Oct. 16, 1998.

(51) Int. Cl.[7] .................................................. B68G 5/00
(52) U.S. Cl. ....................... 248/118; 248/118.1; 248/918; 312/208.1
(58) Field of Search ................................. 248/118.1, 118, 248/918, 288.51, 346.01, 281.11, 278.1, 219.1, 286.1; 312/208.1, 223.3; 108/65, 69, 93

(56) References Cited

U.S. PATENT DOCUMENTS

| D. 387,744 | * | 12/1997 | Kirchhoff et al. ................... D14/114 |
| 4,077,333 | * | 3/1978 | Ballas ......................................... 108/6 |
| 4,616,798 | * | 10/1986 | Smeenge et al. ................. 248/281.1 |
| 4,691,888 | * | 9/1987 | Cotterill ................................ 248/284 |
| 4,863,124 | * | 9/1989 | Ball et al. ............................. 108/28 |
| 4,913,390 | * | 4/1990 | Berke ..................................... 248/176 |
| 4,956,929 | * | 9/1990 | Chirabnadalsuk ................... 318/136 |
| 4,988,066 | * | 1/1991 | Cotterill ............................. 248/281.1 |
| 5,037,054 | * | 8/1991 | Mcconnell ............................ 248/284 |
| 5,072,905 | * | 12/1991 | Hyatt .................................... 248/118 |
| 5,098,053 | * | 3/1992 | Cotterill ............................. 248/181.1 |
| 5,234,186 | * | 8/1993 | Powell ................................ 248/118.1 |
| 5,257,767 | * | 11/1993 | McConnell .......................... 248/284 |
| 5,292,097 | * | 3/1994 | Russell ............................... 248/281.1 |
| 5,294,087 | * | 3/1994 | Drabczyk et al. ................... 248/639 |
| 5,342,006 | * | 8/1994 | Tice ..................................... 248/118 |
| 5,375,800 | * | 12/1994 | Wilcox et al. ..................... 248/118.1 |
| 5,377,951 | * | 1/1995 | Johnson et al. ..................... 248/639 |
| 5,421,543 | * | 6/1995 | Rossman et al. ................. 248/118.3 |
| 5,429,337 | * | 7/1995 | Poole ................................. 248/442.2 |
| 5,443,237 | * | 8/1995 | Stadtmauer ....................... 248/441.1 |
| 5,487,525 | * | 1/1996 | Drabxzyk et al. ................... 248/639 |
| 5,492,298 | * | 2/1996 | Walker ............................ 248/346.01 |
| 5,509,628 | * | 4/1996 | Noble ................................... 248/118 |
| 5,513,579 | * | 5/1996 | Allan ..................................... 108/93 |
| 5,522,572 | * | 6/1996 | Copeland et al. ................... 248/118 |
| 5,564,667 | * | 10/1996 | Copeland et al. ................. 248/278.1 |
| 5,568,907 | * | 10/1996 | Wolfe et al. ......................... 248/118 |
| 5,583,496 | * | 12/1996 | Sharpe, III et al. ................... 341/22 |
| 5,601,264 | * | 2/1997 | Peart ................................ 248/118.1 |

(List continued on next page.)

FOREIGN PATENT DOCUMENTS

9319135 * 3/1994 (DE).
0775456A2 * 5/1997 (DE).

Primary Examiner—Ramon O. Ramirez
Assistant Examiner—Kimberly Wood
(74) Attorney, Agent, or Firm—Flynn, Thiel, Boutell & Tanis, P.C.

(57) ABSTRACT

A keyboard support arrangement which includes both a main support pad for supporting a computer keyboard and an auxiliary support pad for supporting a computer mouse. The auxiliary pad is removably and angularly positionable adjacent either side of the main keyboard pad to provide increased convenience and flexibility of use. The auxiliary mouse pad is totally separable from the main keyboard pad, and a multi-positionable connecting structure enables the auxiliary pad to be positioned relative to the main keyboard pad at one of a plurality of angular positions.

43 Claims, 10 Drawing Sheets

U.S. PATENT DOCUMENTS

| | | | | |
|---|---|---|---|---|
| 5,628,483 | * | 5/1997 | Smith et al. | 248/118 |
| 5,636,822 | * | 6/1997 | Hendershot et al. | 248/346.01 |
| 5,655,743 | * | 8/1997 | Gillis | 248/346.01 |
| 5,685,235 | * | 11/1997 | Allan | 208/93 |
| 5,704,299 | * | 1/1998 | Corpuz, Jr. et al. | 108/50 |
| 5,704,698 | * | 1/1998 | Lin | 248/118 |
| 5,730,408 | * | 3/1998 | Mcallister et al. | 248/288.51 |
| 5,732,910 | * | 3/1998 | Martin | 248/118 |
| 5,924,664 | * | 7/1999 | Mileos et al. | 248/281.11 |
| 5,927,662 | * | 7/1999 | West et al. | 248/118 |
| 5,967,479 | * | 10/1999 | Sweere et al. | 248/280.11 |
| 5,995,082 | * | 11/1999 | Lakoski | 345/168 |
| 6,045,098 | * | 4/2000 | Timm | 248/118 |
| 6,079,676 | * | 6/2000 | Hackett et al. | 248/118 |

* cited by examiner

KEYBOARD PAD WITH REVERSIBLE MOUSE PAD

This is a continuation of Ser. No. 09/174,000, filed Oct. 16, 1998.

FIELD OF THE INVENTION

This invention relates to a keyboard pad arrangement for a computer and, more particularly, to an improved keyboard pad arrangement employing separate keyboard and mouse support pads which are positionable in adjacent and interconnected relationship.

BACKGROUND OF THE INVENTION

Articulated keyboard mechanisms are typically mounted on and associated with work surfaces and desk tops to support a computer keyboard. Such mechanisms are also often provided with an associated support pad for a computer mouse, and this associated support pad is either integrally related to the keyboard support pad so as to have minimum flexibility, or in the alternative includes a wholly independent mouse support pad which, while providing greater flexibility, nevertheless results in additional complications with respect to both structure and mounting.

It is an object of the invention to provide an improved keyboard support arrangement which accommodates both a keyboard and a mouse, but which greatly improves upon both the structure and the convenience and flexibility of use in comparison to known structures.

Prior copending U.S. patent application Ser. No. 08/866,137, which is owned by the same assignee of the instant application and which is hereby incorporated by reference herein, relates to a keyboard pad arrangement with a separate and detachable mouse pad. In an effort to improve on this type of keyboard pad arrangement, the present invention was developed.

In this regard, the present invention relates to an improved keyboard support arrangement which includes both a main support pad for the keyboard, as well as an auxiliary support pad for the mouse, with the auxiliary support pad being removably and multiply positionable on and relative to the main support pad so as to provide increased convenience and flexibility of use with respect to the mouse support pad and the mouse positionable thereon.

In the improved support pad arrangement of the invention, the mouse or auxiliary pad is totally separable from the keyboard support pad, and a connecting structure is provided for permitting the auxiliary pad to be mounted directly from the keyboard support pad adjacent either side edge thereof as selected by the user. In addition, the connecting structure enables the auxiliary support pad to be positioned relative to the keyboard support pad at one of a plurality of different angular relationships so as to provide for increased comfort during use. The connecting structure also permits the auxiliary support pad to be totally and easily detached from the keyboard support pad and moved about as a portable unit, thereby enabling it to be carried about for use as a writing surface, or enabling it to be positioned on a desk top or work surface.

In accordance with a preferred embodiment of the invention, the support pad arrangement includes a main keyboard support pad and an auxiliary support pad adapted to support a computer mouse thereon. The auxiliary pad is detachably supported at either side of the main pad by one of two elongate support elements slidably supported on the main pad and extendible outwardly therefrom. The support pad arrangement additionally includes a fixing structure adapted to hold the auxiliary pad in an engaged position on one of the support elements.

Other objects and purposes of the invention will be apparent upon reading the following specification and inspecting the accompanying drawings.

Certain terminology will be used in the following description for convenience in reference only, and will not be limiting. For example, the words "upwardly", "downwardly", "leftwardly" and "rightwardly" will refer to directions in the drawings to which reference is made. The word "forwardly" will be used in conjunction with the portions of the keyboard arrangement positioned closest to the user, and similarly the word "rearwardly" will refer to portions of the keyboard arrangement positioned remote from the user. The words "inwardly" and "outwardly" will refer to directions toward and away from, respectively, the geometric center of the overall arrangement and designated parts thereof. Said terminology will include the words specifically mentioned, derivatives thereof, and words of similar import.

DETAILED DESCRIPTION

Figure 1:
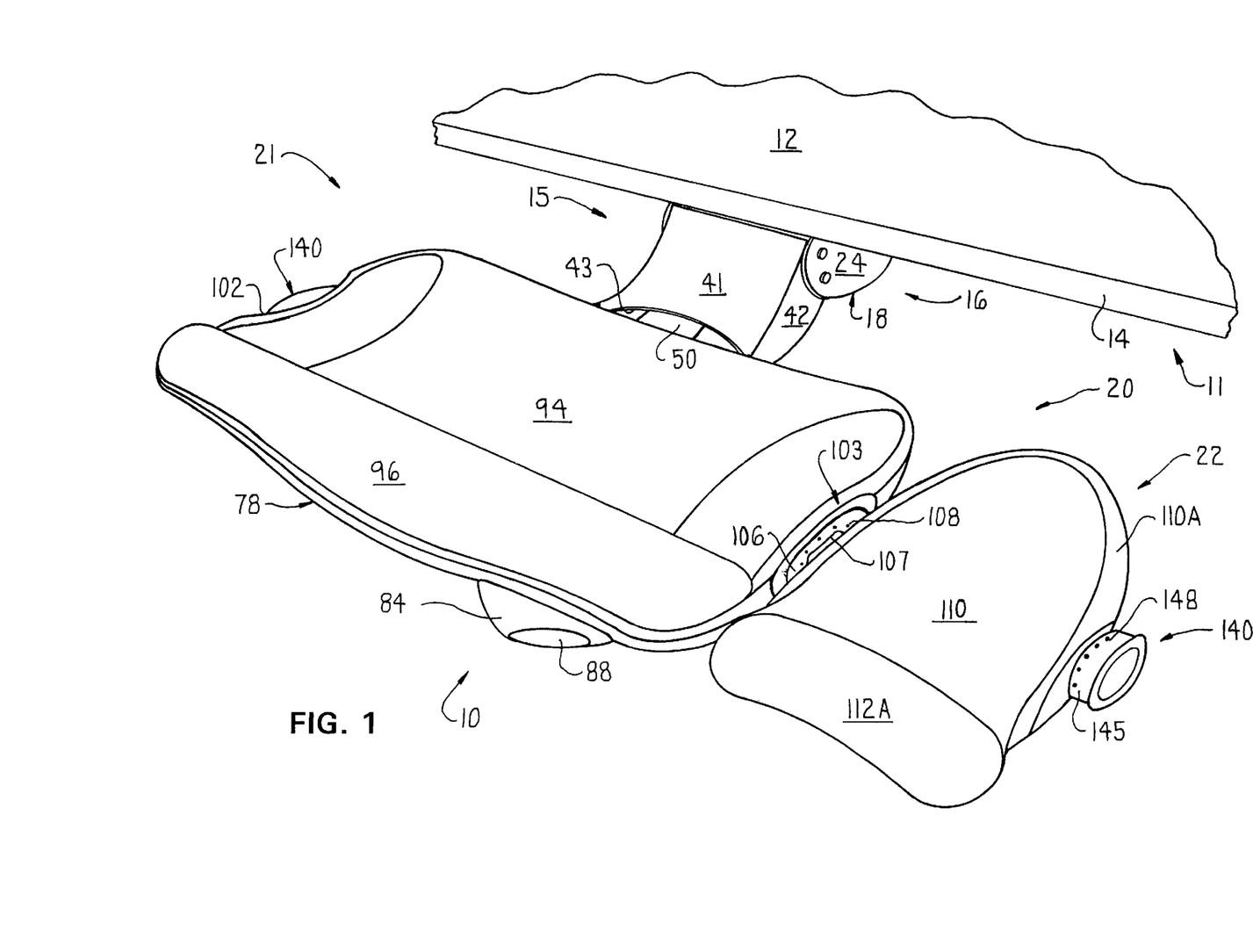
FIG. 1 is a perspective view which illustrates the keyboard support arrangement according to the invention and its attachment to and position adjacent a conventional work surface.
Figure 3:
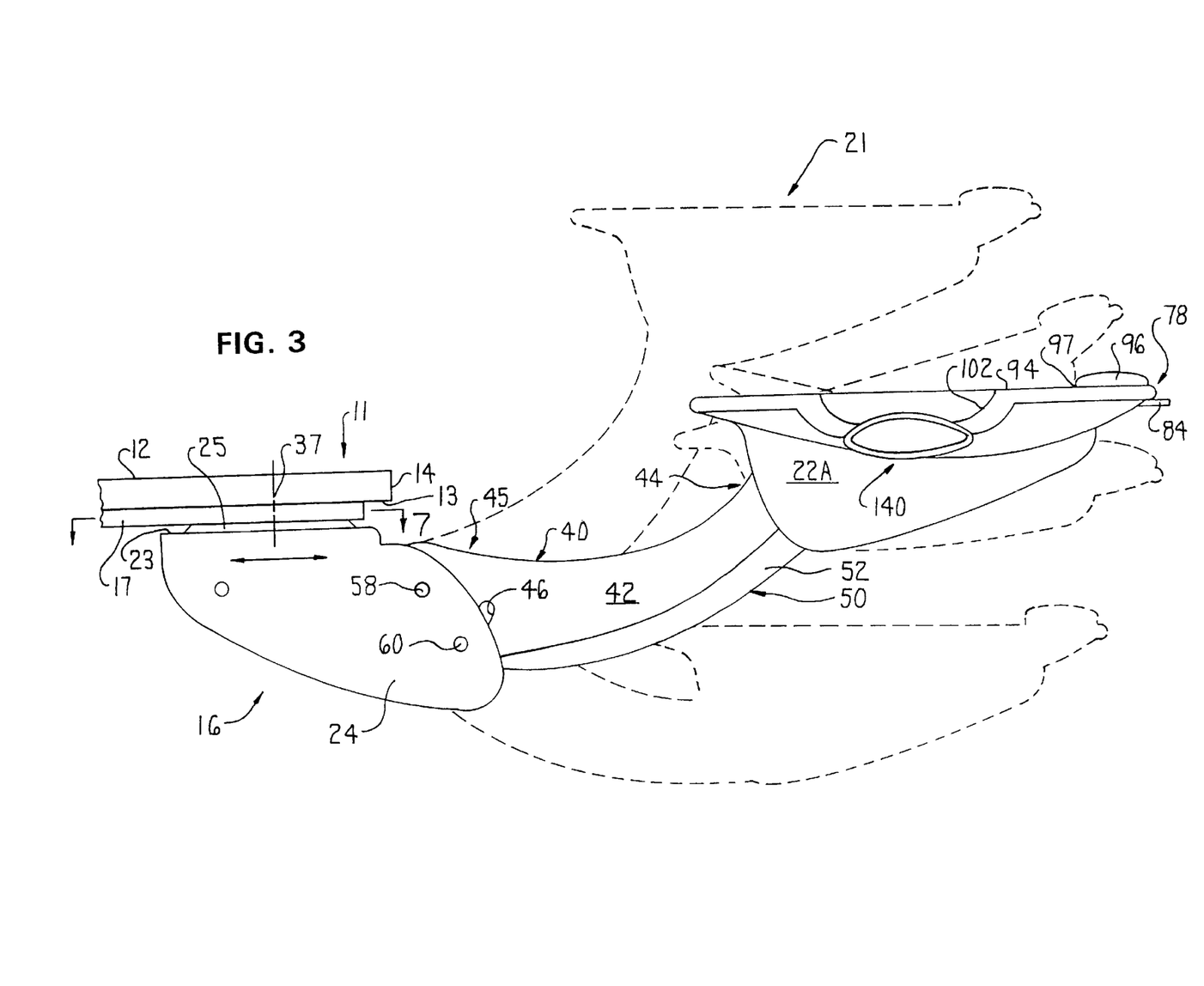
FIG. 3 is a fragmentary left side elevational view of the keyboard support arrangement of FIG. 1.

Referring to the drawings, and specifically FIGS. 1 and 3, there is illustrated an articulated keyboard support arrangement 10 according to the present invention. The arrangement 10 is adapted to be mounted on a conventional work surface or table top 11, the latter having generally horizontal and substantially planar upper and lower surfaces 12 and 13, respectively, with the work surface 11 terminating at a free front edge 14.

The keyboard support arrangement 10 in the illustrated embodiment includes an elongate support arm 15 which at the rear end thereof couples to a carriage 16 which is positionable under the table top 11. The carriage 16 is preferably confined for sliding movement in a front-to-back direction of the table top 11 by means of an elongate track 17 stationarily and horizontally mounted on the lower surface 13 of table top 11. The forward end of the support arm 15 mounts thereon a pad assembly 20, which pad assembly 20 includes a main keyboard support pad 21 and an auxiliary support pad 22 for supporting a computer keyboard and a computer mouse, respectively. As shown in FIG. 3, the main pad 21 preferably includes a bottom cover 22A.

Figure 4:
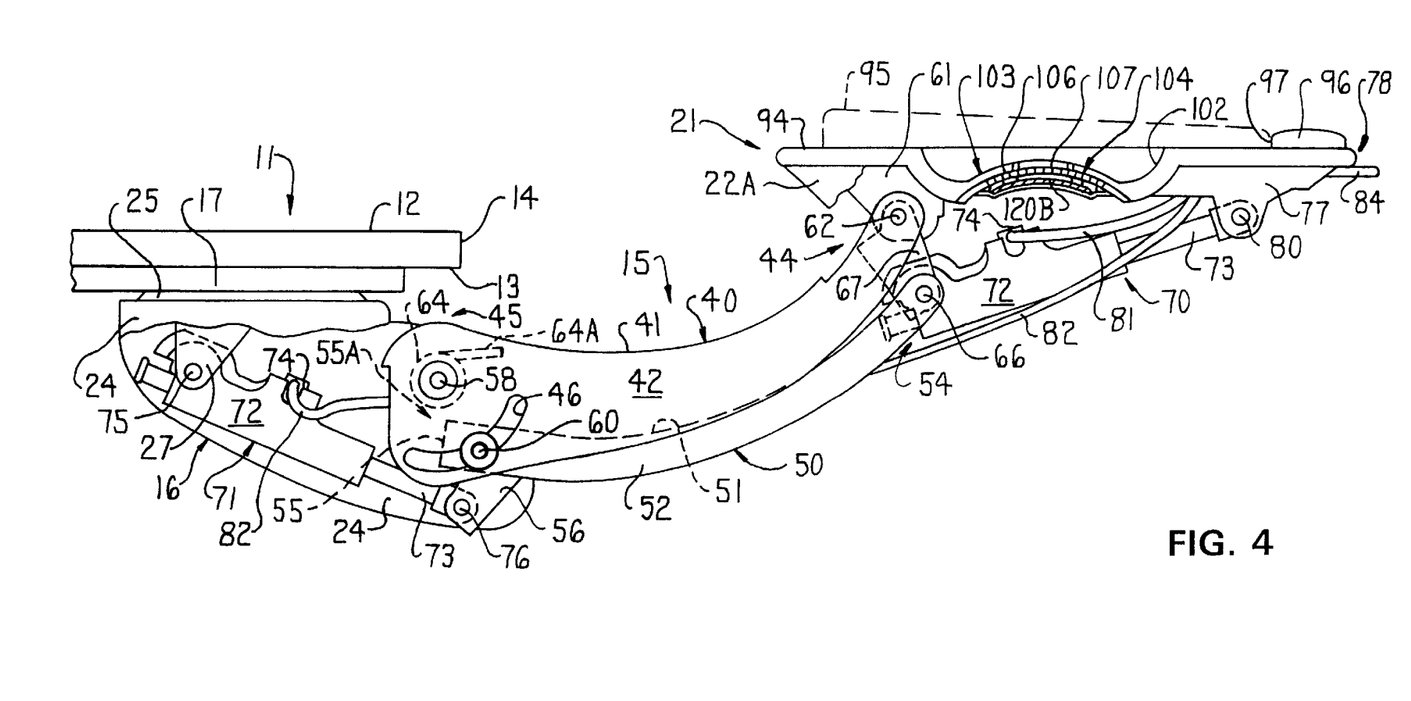
FIG. 4 is an enlarged, fragmentary left side view of the keyboard support arrangement similar to FIG. 3 with the bottom cover removed therefrom.
Figure 7:
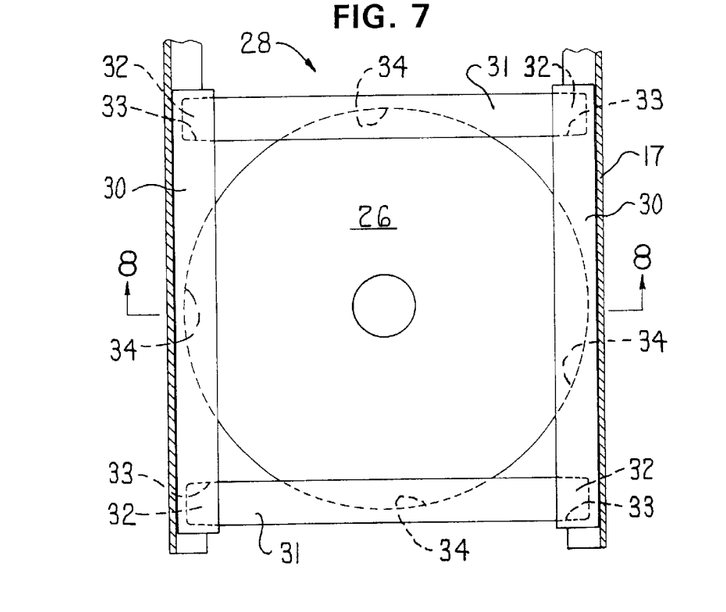
FIG. 7 is an enlarged, fragmentary, cross-sectional view taken generally along line 7—7 in FIG. 3.
Figure 9:
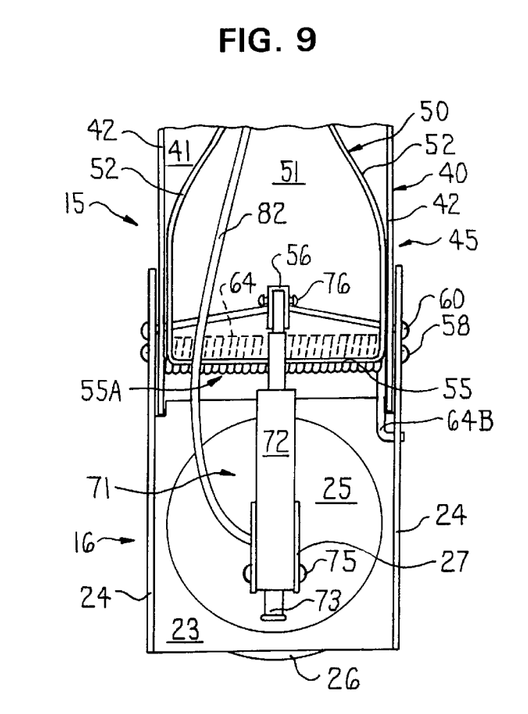
FIG. 9 is a fragmentary bottom view of the support arm and carriage.

With reference to FIGS. 3, 4 and 9, the carriage 16 is preferably embodied by a bracket 18 which is substantially U-shaped in cross-section. Bracket 18 includes a top wall 23 and a pair of side walls 24 which extend generally perpendicularly and downwardly from opposite sides of top wall 23. Top wall 23 includes an upwardly projecting boss portion 25 which substantially defines the upper surface thereof and which nonrotatably mounts thereon a circular plate or disc 26 (FIG. 7). The bottom surface of top wall 23 fixedly mounts thereon a rear brake bracket 27 (FIGS. 4 and 9) for a purpose as discussed below.

Figure 8:
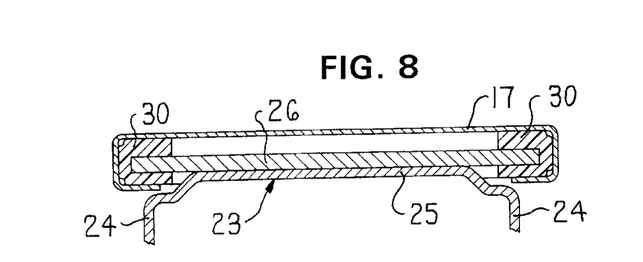
FIG. 8 is an enlarged, fragmentary, cross-sectional view taken generally along line 8—8 in FIG. 7.

As illustrated in FIGS. 7 and 8, carriage 16 additionally includes a frame-like slide arrangement 28 having a pair of generally parallel and elongate guide members 30 and a pair of generally parallel and elongate cross members 31 which extend perpendicularly to guide members 30. Each cross member 31 extends between adjacent ends of the respective guide members 30, and terminal ends 32 of each cross member 31 extend into an inwardly opening recess 33 located adjacent the ends of the guide members 30. Each guide and cross member 30 and 31 respectively includes an inwardly opening, semi-circular groove 34 in which the outer periphery of disc 26 engages to fixedly but rotatably confine disc 26 within frame-like arrangement 28.

As best shown in FIG. 7, the frame-like slide arrangement 28 is confined within track 17. Specifically, guide members 30 slidably engage within track 17 and enable slidable movement of the keyboard support arrangement 10 relative to the work surface 11 in a front-to-back direction as indicated by the arrow in FIG. 3. Further, the above-discussed grooved configuration of members 30 and 31 allows rotation of the disc 26 therewithin about a generally vertical axis 37, which permits the keyboard support arrangement 10 to be angularly displaceable relative to the work surface 11. In this regard, depending upon the particular length and width dimensions of the work surface, the keyboard support arrangement 10 according to the invention may horizontally swivel 360° relative to the work surface.

The guide and cross members 30 and 31 are preferably constructed of a hard plastic so as to properly function as slide or bearing members.

Figure 6:
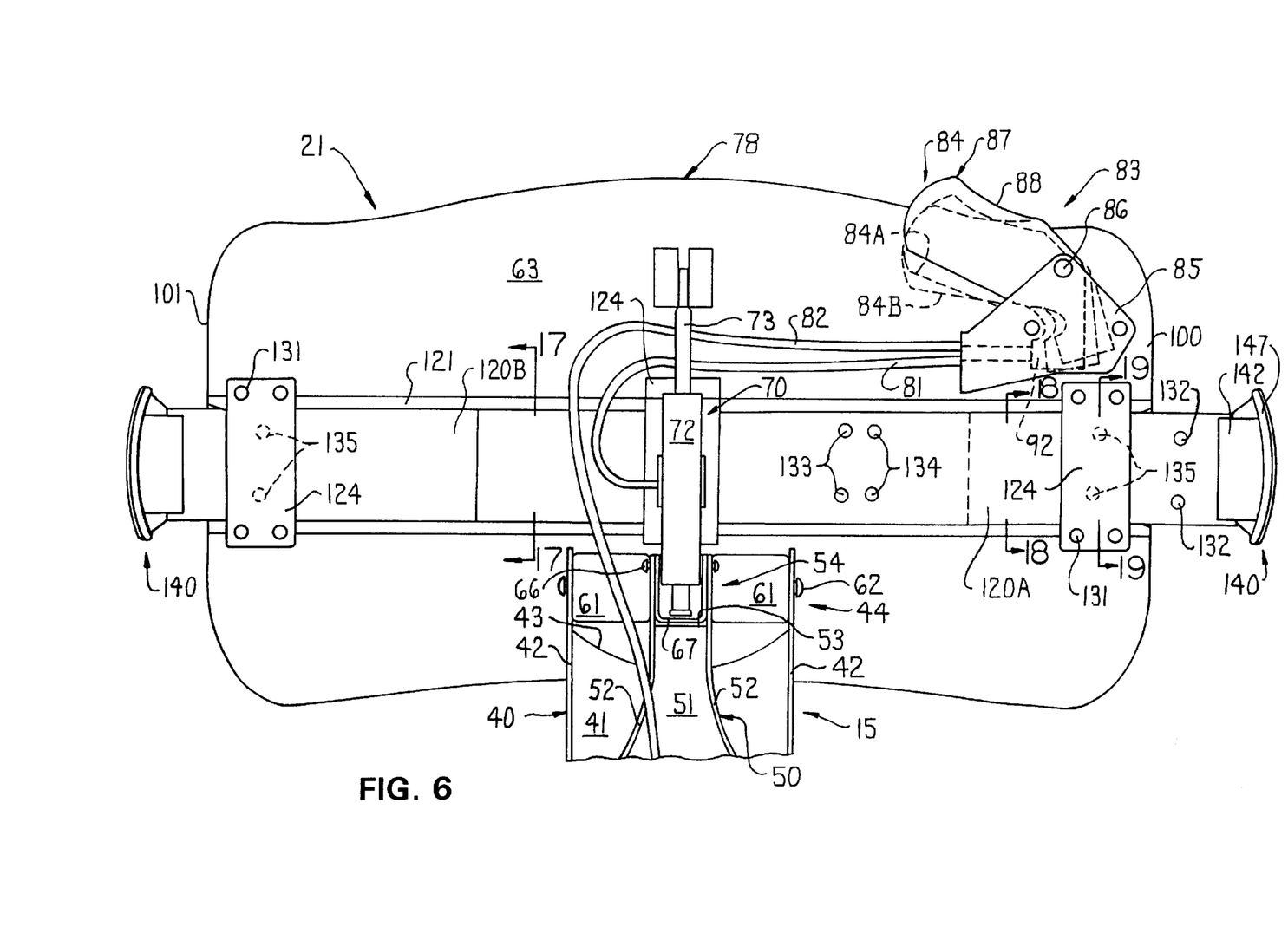
FIG. 6 is a fragmentary bottom view of the keyboard support arrangement of FIG. 1, but with the bottom cover removed and without the auxiliary mouse pad.

Considering now the construction of the support arm 15, same includes an outer or upper arm 40 which is generally U-shaped in cross-section and has an upper wall 41 which is arcuate when viewed from the side (FIG. 3), and a pair of generally parallel and flat side walls 42 which extend generally perpendicularly and downwardly from opposite longitudinal edges of upper wall 41. The upper wall 41 preferably terminates at an edge 43 which is recessed with respect to side walls 42 (i.e. side walls 42 project in the forward direction further than upper wall 41) to provide outer arm 40 with a forked front end 44 (FIG. 6). Each side wall 42 of outer arm 40 includes a generally arcuately shaped slot 46 (FIG. 4) at a rear end 45 of outer arm 40.

Support arm 15 also includes an inner or lower arm 50 which is also U-shaped in transverse cross-section and has an upper wall 51 having a generally arcuate shape when viewed from the side (FIG. 4). Planar side walls 52 preferably extend transversely and downwardly from opposite longitudinal edges of upper wall 51. Upper wall 51 terminates at an edge 53 which is recessed to provide inner arm 50 with a forked front end 54 (FIG. 6). For added rigidity, inner arm 50 also includes a rear wall 55 (FIG. 9) which extends downwardly from upper wall 51 and transversely between side walls 52, which rear wall 55 defines a rear end 55A of inner arm 50. A rear brake bracket 56 (FIGS. 4 and 9) is fixedly mounted on a bottom surface of upper wall 51 and projects generally downwardly therefrom.

Rear end 45 of outer arm 40 is joined to carriage bracket 18 by generally horizontal upper and lower pivots 58 and 60 (FIGS. 4 and 9). Lower pivot 60 preferably extends through slots 46 of outer arm 40. Front end 44 of outer arm 40 is joined by a generally horizontal pivot 62 (FIG. 6) to a pair of spaced-apart support brackets 61, which support brackets 61 are stationarily mounted to a lower surface 63 of main pad 21. A coil spring 64 is preferably disposed about upper pivot 58 to surround same. One end 64A (shown in dotted lines in FIG. 4) of coil spring 64 engages with a lower surface of upper wall 41 of outer arm 40 and the other end 64B is fixedly held in an opening in side wall 24 of carriage bracket 18 (FIG. 9). Rear end 55A of inner arm 50 is joined to carriage bracket 18 by lower pivot 60 (FIG. 4), and front end 54 of inner arm 50 is joined to an inner arm bracket 67 (FIG. 6) by a pivot 66. The inner arm bracket 67, in the illustrated embodiment, is preferably movably disposed between the pair of stationary support brackets 61 on main pad 21, and is arranged so as to be pivotable about pivot 62. As best shown in FIGS. 6 and 9, inner arm 50 nests within outer arm 40, i.e. between the side walls 42 thereof.

The pivot arrangement defined by the outer and inner arms 40 and 50 effectively defines a four-bar linkage so that the entire pad assembly 20 can be vertically raised and lowered to a suitable height by upward and downward swinging of the support arm 15 about pivots 58 and 60, as discussed in further detail below. The four-bar linkage preferably substantially defines a parallelogram when the main support pad 21 is horizontally oriented or is in reasonably close orientation thereto.

Keyboard support arrangement 10 additionally includes a brake assembly including front and rear brakes 70 and 71, each of which has a housing 72, a shaft 73 slidably disposed within housing 72, and a generally circular clamping member 74 located within housing 72 and in surrounding relation to shaft 73. Clamping member 74 is preferably normally biased into frictional contact with shaft 73 to lock same in a desired position relative to housing 72 and is releasable for shaft 73 as discussed below. Brakes such as those discussed above are conventional, and are commonly known and commercially available as PL Porter Brakes. As shown in FIGS. 4 and 9, housing 72 of rear brake 71 at one end thereof is joined to rear brake bracket 27 of carriage bracket 18 by a generally horizontal pivot 75, and the terminal end of shaft 73 of rear brake 71 located exteriorly of the housing 72 thereof is joined to rear brake bracket 56 of inner arm 50 by a generally horizontal pivot 76. Housing 72 of front brake 70 at one end thereof is joined to inner arm pivot bracket 67 by pivot 66, and the terminal end of shaft 73 of front brake 70 is joined to a front brake bracket 77 fixedly mounted on lower surface 63 of main pad 21 adjacent a forwardmost edge 78 thereof by a pivot 80. Brake assembly also includes conventional sheathed flexible cables 81 and 82 each having a terminal end fixed to the clamping member 74 of one of the respective front and rear brakes 70 and 71. Thus, when cables 81 and 82 are actuated, the respective clamping member 74 releases shaft 73.

With reference to FIG. 6, keyboard support arrangement 10 also includes an actuator assembly 83 having a generally L-shaped actuator lever 84 and an actuator bracket 85. Actuator bracket 85 is preferably U-shaped and is fixedly mounted on the lower surface 63 of main pad 21 adjacent front edge 78 thereof. Actuator lever 84 is pivotably mounted between respective legs of actuator bracket 85 by a generally vertical pivot 86. A front portion 87 of actuator lever 84 preferably extends outwardly past front edge 78 of main pad 21 to provide ready access to actuator lever 84, and a recessed finger grip 88 is formed in the front portion 87 for the convenience of the user. The actuator lever 84 additionally includes a rear portion 92 opposite front portion 87, which rear portion 92 fixedly mounts thereat terminal ends of cables 81 and 82.

The actuator 84 lever is movable about pivot 86 within a plane which is generally parallel to the plane defined by main pad 21. In this regard, in accordance with one embodiment of the invention, the actuator lever 84 is preferably pivotably movable inwardly (i.e. towards the front edge 78 of main pad 21) into one of two actuating positions as indicated by dotted lines 84A and 84B in FIG. 6. Actuating positions 84A and 84B respectively permit tilting of main pad 21 with respect to the horizontal, and vertical height adjustment of the keyboard support arrangement 10 with respect to the work surface 11, as discussed below.

The inner arm bracket 67 enables main pad 21 to be vertically tilted into a desired position about horizontal pivot 62 as indicated by dotted lines in FIG. 3. The degree of tilt of main pad 21 is in a range of between about 10° to about 20° upwards or downwards from the horizontal, and is preferably tiltable about 15° upwards or downwards from the horizontal. In order to adjust the angular position of main pad 21 with respect to the horizontal, pressure is exerted by the user on front portion 87 of actuator lever 84 to pivot lever 84 inwardly a small amount into position 84A (FIG. 6). This pivoting movement of lever 84 actuates front brake cable 81 which operates to release clamping lever 74 of front brake 70 from shaft 73 thereof and allows tilting of main pad 21 in either a clockwise or counterclockwise direction about pivot 62. In order to lock the main pad 21 in the selected angular position, the actuator lever 84 is released, which causes clamp 74 to reengage with shaft 73 and lock front brake 70.

This pivoting movement of actuator lever 84 into position 84A (i.e. the "tilt" position) also actuates rear brake cable 82. However, rear brake cable 82 preferably includes a sufficient amount of slack so that pivoting actuator lever 84 into position 84A does not release the rear brake 71.

In order to adjust the vertical height of the keyboard support arrangement 10, the actuator lever 84 is pivoted inwardly a greater amount into position 84B by exerting pressure on the front portion 87 thereof, which serves to release both front and rear brakes 70 and 71 and allows either upward or downward swinging movement of support arm 15 with respect to the work surface 11. In this regard, the slot 46 of outer arm 40 preferably defines and limits the upward and downward movement of support arm 15. During upward and downward movement of the support arm 15, the inner arm bracket 67 pivots about pivot 62 to enable the inner arm 50 and the front brake 70 to move as necessary with respect to outer arm 40. Further, the coil spring 64 preferably biases the support arm 15 upwardly with respect to work surface 11, and therefore assists the user in raising the keyboard support arrangement 10 from a lowered position.

In accordance with an alternative embodiment of the invention, the slack in rear brake cable 82 may be removed, and both front and rear brakes 70 and 71 may be released upon a single actuating movement of actuator lever 84 so that the tilt of main pad 21 and the vertical height of keyboard support arrangement 10 can be adjusted simultaneously.

Considering now the construction of the pad assembly 20 and specifically the main pad 21 thereof, same includes a generally horizontally enlarged and substantially planar upper surface 94 for supporting a conventional computer keyboard 95 thereon (shown in dotted lines in FIG. 4). The main pad 21 is also preferably provided with an elongate wrist or palm rest 96 disposed adjacent the front edge 78 thereof. The wrist rest 96 is preferably embodied by an elongate foamed or gel cushion which may be supported directly on the main pad 21 so as to project upwardly above upper surface 94, whereby the wrist rest 96 defines an upwardly projecting abutment surface 97 on the rear edge thereof, the latter functioning to confine the keyboard 95 on the main pad 21. If desired, the wrist rest 96 may be adjustable in height to suit the individual operator, and for this purpose may be provided with one or more adjustment levers or knobs (not shown) adjacent the front edge 78 of the main pad 21, for example.

Figure 11:
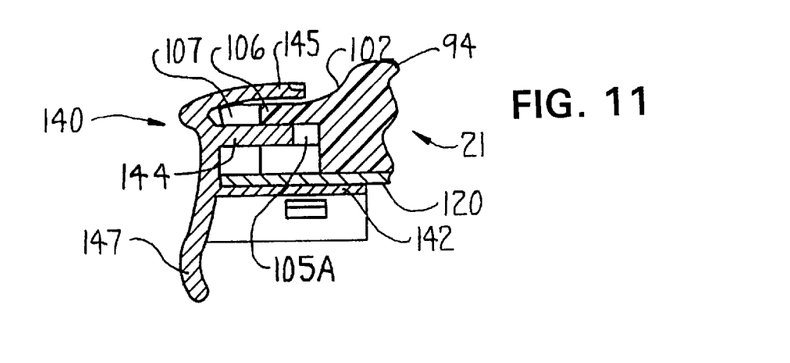
FIG. 11 is an enlarged, fragmentary, cross-sectional view taken generally along line 11—11 of FIG. 2.
Figure 13:
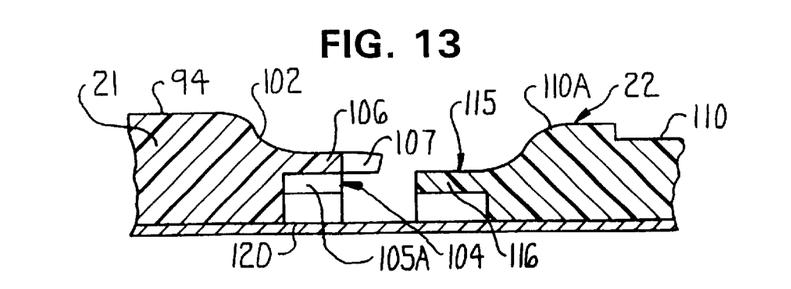
FIG. 13 is an enlarged, fragmentary, cross-sectional view take generally along line 13—13 of FIG. 5.

Main pad 21 additionally includes, substantially midway along each of right and left side edges 100 and 101 thereof, a recess 102 (FIG. 3) and a connecting member 103 (FIG. 4) located within recess 102. Each connecting member 103 includes a serrated or toothed sector 104. Each toothed sector 104 includes a plurality of teeth 105 (FIG. 5), with a space 105A between adjacent pairs of teeth 105. The toothed sectors 104 are generally arcuate in configuration when viewed from the side as illustrated in FIG. 4. Each of the connecting members 103 also includes a shroud 106 disposed above the respective toothed sector 104 to cover same as shown in FIGS. 11 and 13. Shroud 106 is shown in broken section in FIG. 5 to more clearly illustrate teeth 105. In accordance with a preferred embodiment of the invention, the shrouds 106 each include an inwardly extending recess 107, along the edge of which recess 107 a plurality and preferably five position markers 108 are located on shroud 106 for a purpose discussed below.

Figure 2:
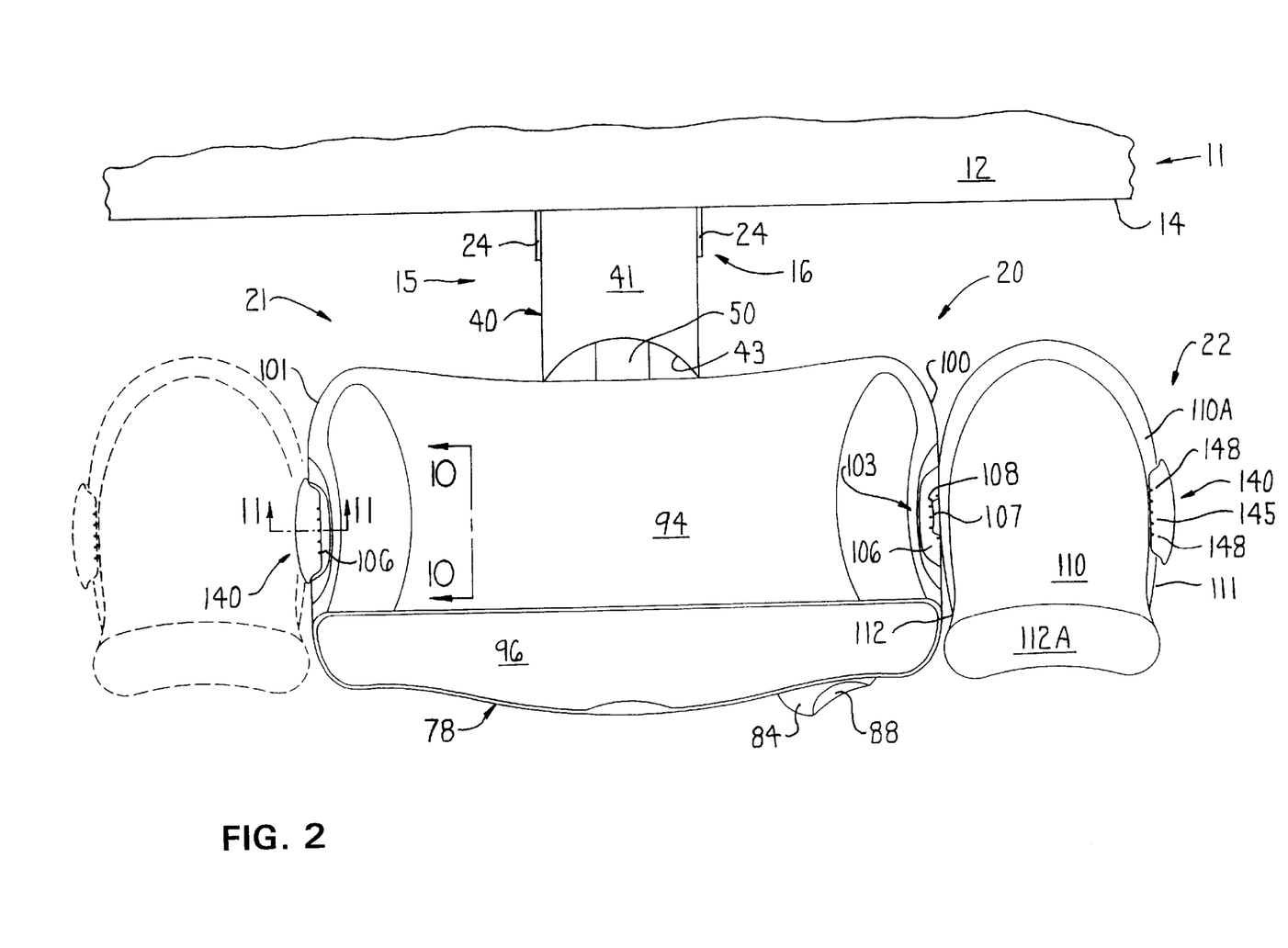
FIG. 2 is a top view which illustrates the pad assembly including the main keyboard pad and the auxiliary mouse pad.

The auxiliary pad 22 of the pad assembly 20 includes a generally horizontally enlarged upper surface 110 which has a suitable smoothness and softness so as to provide optimum support and performance for a conventional computer mouse. A raised shoulder 110A (FIG. 5) preferably substantially surrounds surface 110 so as to confine the mouse (not shown) on pad 22. Shoulder 110A preferably extends along right and left side edges 111 and 112 of pad 22 and also along a rear edge 111A of pad 22. With reference to FIG. 2, the right and left side edges 111 and 112 which are configured so as to be positionable adjacent and compatible with respective corresponding left and right side edges 101 and 100 of main pad 21. That is, the edges 111 and 101 are of corresponding and complementary configuration so as to be positionable directly adjacent one another substantially as shown in FIG. 2, and the remaining edges 112 and 100 are also of similar configuration so as to be positionable directly adjacent one another. As such, the auxiliary pad 22 can be disposed closely adjacent the right side edge 100 of main pad 21, as shown in FIG. 2, or alternatively the auxiliary pad 22 can be positioned directly adjacent the left side edge 101 of main pad 21 as indicated by dotted lines in FIG. 2.

Figure 15:
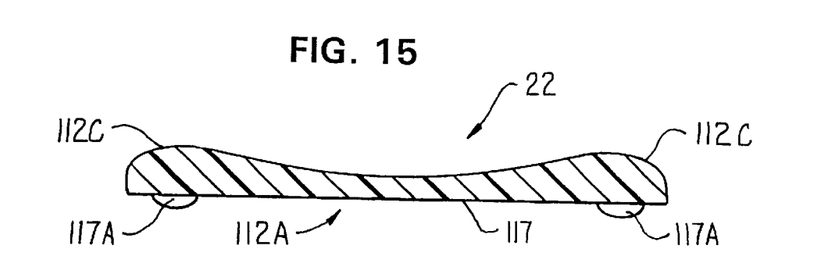
FIG. 15 is a front end view of the auxiliary pad taken generally along line 15—15 of FIG. 5.
Figure 16:
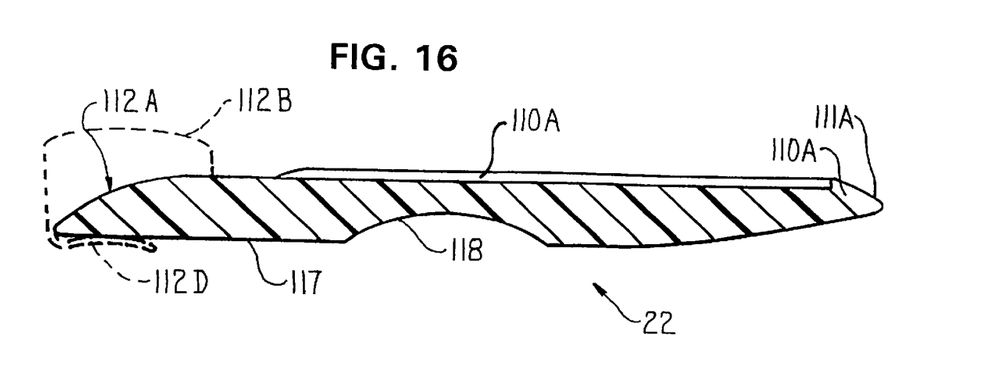
FIG. 16 is a cross-sectional view taken generally along line 16—16 of FIG. 5.
Figure 17:
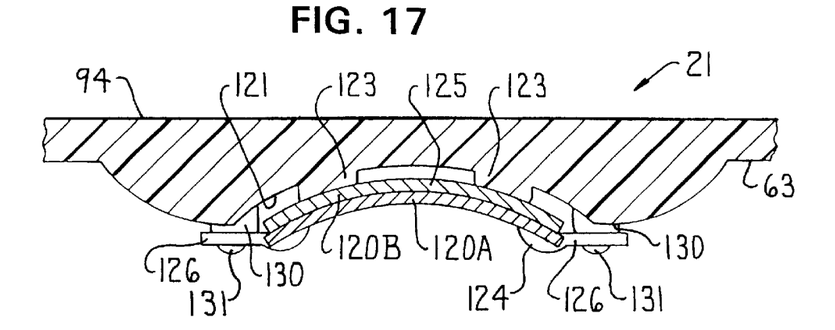
FIG. 17 is an enlarged, fragmentary, cross-sectional view taken generally along line 17—17 of FIG. 6.

As best shown in FIG. 15, the auxiliary pad 22 preferably includes a front edge portion 112A which, in transverse cross-section as shown in FIG. 15 is generally concave in a middle region thereof such that smoothly curved and convex shoulders 112C are formed at opposite ends of front portion 112A. As shown in FIG. 16, the front edge portion 112A of auxiliary pad 22 in longitudinal cross-section curves smoothly downwardly in a generally convex configuration.

The auxiliary pad 22 may, if desirable, also include a palm or wrist rest 112B (FIG. 16) of a soft cushion construction adjacent the front edge thereof similar to wrist rest 96 of the main pad 21. The wrist rest 112B can preferably be held on pad 22 by resilient, lower clips 112D which engage the lower surface 117 of pad 22. Wrist rest 96 can preferably have an inner contour which conforms to front edge portion 112A of pad 22.

Figure 14:
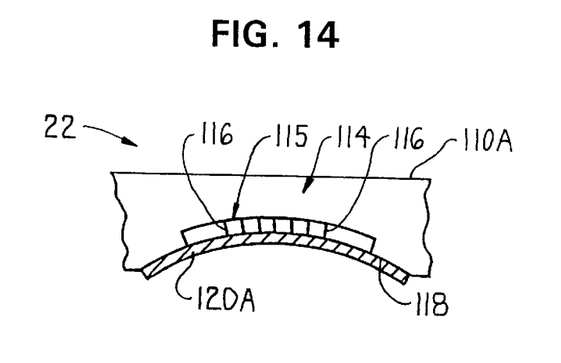
FIG. 14 is an enlarged, fragmentary, cross-sectional view taken generally along line 14—14 of FIG. 5.

The auxiliary pad 22 additionally includes right and left connecting members 113 and 114 (FIG. 5), each having a toothed sector 115 including a plurality of teeth 116, with four such teeth 116 included in the illustrated embodiment. The toothed sectors 115 preferably have a generally arcuate configuration when viewed from the side as best illustrated in FIG. 14. More specifically, toothed sectors 115 lie along a similar curve as toothed sectors 104 of main pad 21 (both curves being generated about a common axis). The lower surface 117 of auxiliary pad 22, as shown in FIG. 14, preferably has an elongate channel 118 formed therein which is generally arcuate in cross-section and extends in a generally linear manner transversely across lower surface 117 and between the connecting members 113 and 114.

The auxiliary pad 22 according to the invention is detachable from main pad 21 and mountable directly thereon by means of a support assembly including right and left elongate and generally linear support beams 120 (FIG. 6). Each support beam 120A and 120B is generally arcuate in transverse cross-section with the longitudinal edges thereof preferably facing downwardly.

Figure 10:
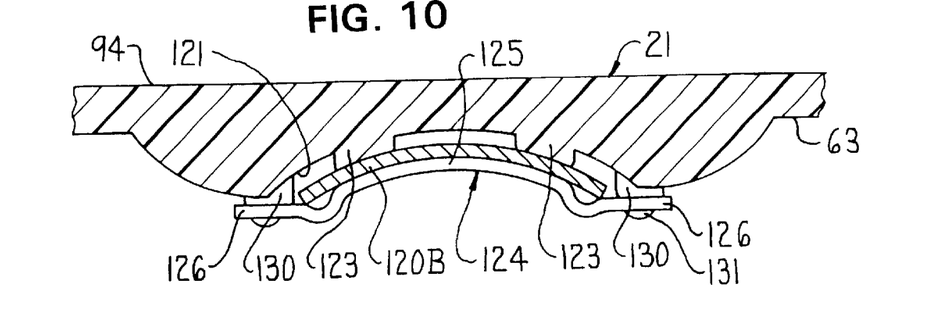
FIG. 10 is an enlarged, fragmentary, cross-sectional view taken generally along line 10—10 of FIG. 2.
Figure 18:
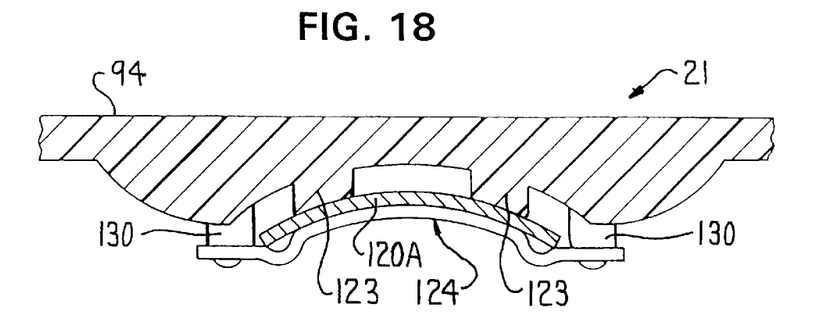
FIG. 18 is an enlarged, fragmentary, cross-sectional view taken generally along line 18—18 of FIG. 6.

The support beams 120A, 120B are preferably slidably mounted so as to engage with an elongate guide member or track 121 (FIG. 6) which is disposed on the lower surface 63 of main pad 21 and is oriented generally parallel to the longitudinal dimension thereof. The guide track 121 is preferably arcuate in transverse cross-section as illustrated in FIG. 10, so as to generally conform to the arcuate shape of the support beams 120A, 120B. Guide track 121 preferably includes a pair of parallel guide ribs or ridges 123 (FIG. 10) which extend along the length thereof and make contact with the upper surface of the support beams 120A, 120B. Further, as shown in FIG. 18, guide track 121 and ridges 123 thereof are configured so as to allow the overlap of the beams 120A, 120B, i.e. the ridges 123 project further downwardly adjacent support beam 120A so that beam 120A can ride beneath or over beam 120B.

Figure 19:
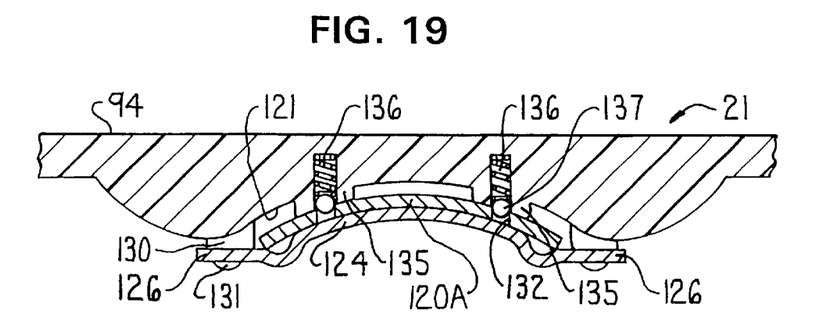
FIG. 19 is an enlarged, fragmentary, cross-sectional view taken generally along line 19—19 of FIG. 6.

Each support beam 120A, 120B is slidably secured to the lower surface 63 of main pad 21 by means of a beam support bracket 124 (FIGS. 6 and 10) two of which are located adjacent a respective side edge 100 and 101 of main pad 21, and a third of which is located in a middle region of lower surface 63. The beam support brackets 124 each include a middle portion 125 having a similar contour as the lower surface of the respective support beam 120A, 120B, and terminal ends 126 which are secured to lower surface 63 by means of appropriate mounting projections 130 and fasteners 131. The support beams 120A, 120B are thus individually slidable outwardly relative to the respective side edge 100 and 101 into an extended position, and are individually slidable inwardly into a retracted position so that the support beam 120A, 120B is located substantially completely beneath the main pad 21. In this regard, three pairs of holes 132, 133 and 134 are provided in each support beam 120A and 120B. Holes 132 are preferably located adjacent the outer terminal end of each beam 120A and 120B, holes 133 are located approximately midway along each beam 120A and 120B, and holes 134 are located adjacent holes 133. With reference to FIG. 19, main pad 21 preferably includes a pair of bosses 135 adjacent end brackets 124 which project generally downwardly from main pad 21. Each boss 135 confines therein a coil spring 136, which coil spring 136 preferably biases a spherical balls bearing 137 adjacent the upper surface of the respective support beam 120A and 120B. When the support beam 120A, 120B is moved into a fully retracted position under main pad 21, each roller bearing 137 is biased by spring 136 so as to partially project into the respective hole 132 of the support beam which serves to hold the support beam in the retracted position. The roller bearings 137 also serve to hold the respective support beam in extended and partially extended positions for mounting auxiliary pad 22 on main pad 21 as discussed further below.

Figure 5:
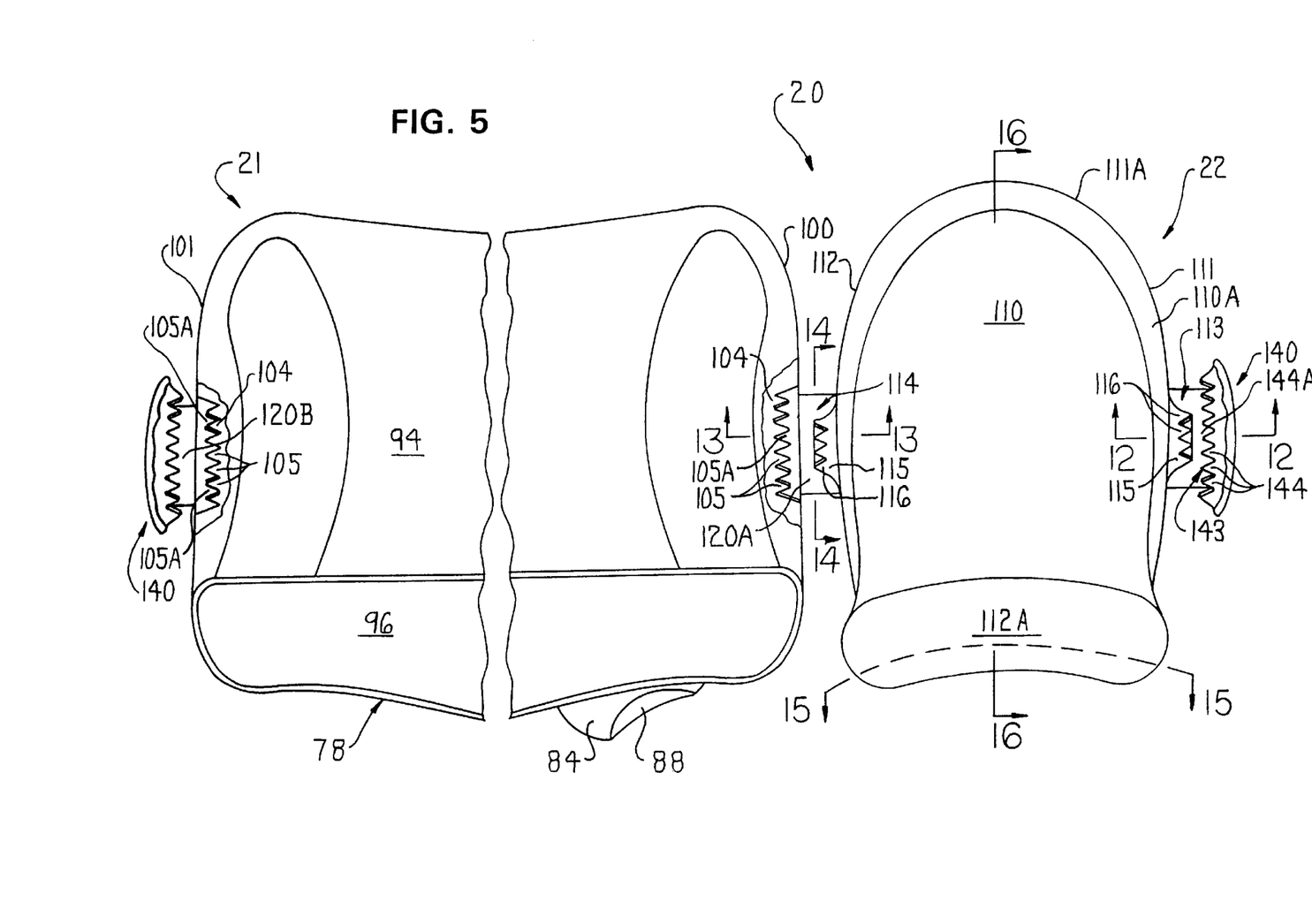
FIG. 5 is an enlarged, fragmentary top view illustrating the right support beam in an extended position.
Figure 12:
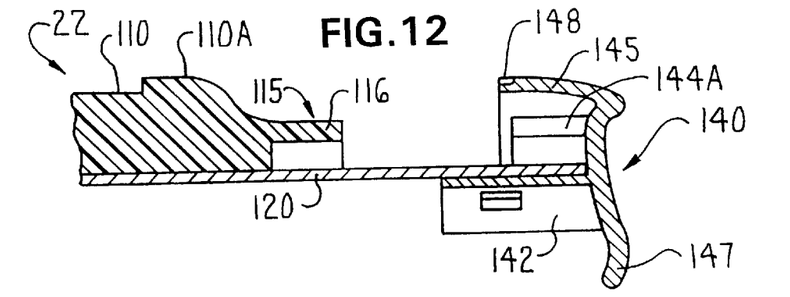
FIG. 12 is an enlarged, fragmentary, cross-sectional view taken generally along line 12—12 of FIG. 5.

Each support beam 120A, 120B preferably includes a cap or handle 140 fixedly mounted at the outer free end thereof by a mounting flange 142 which extends inwardly and generally horizontally along the lower side of the respective support beam 120A, 120B and is fastened thereto. Mounting flange 142 preferably has an arcuate cross-sectional shape which conforms to the arcuate cross-sectional shape of the support beam 120A, 120B. As best shown in FIG. 5, each handle 140 includes an arcuate toothed sector 143 having a plurality of teeth 144 with spaces 144A therebetween, and a shroud 145 (FIGS. 11 and 12) which extends inwardly and above teeth 144 to cover same. Each shroud 145 also includes a plurality of position markers 148 which generally longitudinally align with markers 108. For the convenience of the user, each handle 140 also includes a lower portion 147 which can be utilized to assist the user in moving the respective support beam 120A, 120B.

Main paid 21, including brackets 61 and 77 and guide track 121 may be formed as a one-piece injection molded plastic component, or may be separate components and appropriately fastened to one another. Similarly, auxiliary pad 22 may be formed as an injection molded plastic component. Support beams 120A, 120B, support arm 15 and carriage 16 may be formed of a lightweight metal such as aluminum.

To mount the auxiliary pad 22 on the main pad 21, and for example on the right side 100 of the main pad 21, the handle 140 of the right support beam 120A is grasped and support beam 120A is pulled outwardly into its fully extended position (FIG. 5) so that the roller bearings 137 disengage from holes 132, slide along beam 120A and then engage in the respective holes 133 of beam 120A. The auxiliary pad 22 is then lowered towards the support beam 120A until the upper surface of beam 120A engages in the correspondingly configured recess 118 of the auxiliary pad 22. To lock the auxiliary pad 22 into position with respect to the main pad 21, the support beam 120A is then pushed inwardly into a partially retracted position until the teeth 144 of the support beam handle 140 engage with the correspondingly configured teeth 116 of the auxiliary pad 22 located along the right side edge 111 thereof, the teeth 116 of the auxiliary pad 22 located along the left side edge 112 thereof engage with the teeth 105 located along the right side edge 100 of the main pad 21, and the roller bearings 137 engage in the respective holes 134 of beam 120A.

As shown in FIG. 2, when the auxiliary pad 22 is locked in place along one side of main pad 21, the shroud 145 of support beam handle 140 covers and thus hides the teeth 144 thereof and teeth 116 of auxiliary pad 22, and the shroud 106 of main pad 21 preferably covers and thus hides the teeth 105 thereof and teeth 116 of auxiliary pad 22.

To adjust the angular position of the auxiliary pad 22 with respect to the main pad 21, the support beam 120 is again moved outwardly relative to right side edge 100 of main pad 21 a sufficient amount so that both pairs of teeth (i.e. teeth 105 of main pad 21 and left-side teeth 116 of auxiliary pad 22, and right-side teeth 116 of auxiliary pad 22 and teeth 144 of beam handle 140) disengage from one another, the auxiliary pad 22 is then pivoted on the beam 120A into the desired position, and the support beam 120A is then pushed inwardly until the pairs of teeth re-engage one another and lock the auxiliary pad 22 in the newly selected angular orientation. The position markers 108 of main pad 21 and the position markers 148 of handle 140 can preferably assist the user in selecting the desired position of pad 22.

The auxiliary pad 22 may be repositioned adjacent the left side 101 of the main pad 21 simply by sliding the right support beam 120A outwardly to disengage the pairs of teeth from one another, lifting pad 22 away from beam 120A, and positioning auxiliary pad 22 on left side beam 120B in a similar manner as described above.

Due to the ease with which the auxiliary pad 22 can be mounted on and interchanged from either a right side 100 to a left side 101 position relative to the main pad 21, or in fact detached totally from the main pad 21, the auxiliary pad 22 hence can be readily used for other purposes or conveniently repositioned. For example, the auxiliary pad 22 may be completely removed from main pad 21 in the manner discussed above, and positioned on an adjacent work surface or desk top if so desired. In this regard, auxiliary pad 22 can be provided with support feet 117A (FIG. 15) adjacent front and rear corners of pad 22 which project downwardly from the lower surface 117 of the pad 22. Alternately, the auxiliary pad 22, when detached from main pad 21, can be carried about and used separately as a writing surface or otherwise.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a work station arrangement including a work surface, a pad with a generally horizontally enlarged upper surface for supporting a computer keyboard thereon, and a support arm having a first end connected to said pad and a second end connected to the work surface, comprising the improvement wherein a braking assembly cooperates between said pad and said support arm which when in an engaged position fixes said pad in a selected orientation relative to the work surface, and a lever mounted on said pad for pivoting movement about a generally vertical axis and within a plane generally parallel to a plane defined by said upper surface, said lever being connected to cabling associated with said braking assembly and having an actuator portion disposed adjacent a front edge of said pad, said actuator portion being manually actuable by a user to release said braking assembly and permit adjustment of the orientation of said pad relative to the work surface.

2. The arrangement of claim 1 wherein manual actuation of said lever by a user permits simultaneous adjustment of a vertical position of said pad relative to the work surface and an angular position of said pad relative to the work surface.

3. The arrangement of claim 2 wherein said first end of said support arm is pivotably connected to said pad and said second end of said support arm is pivotably connected to the work surface, said braking assembly including a first brake which cooperates with said first end of said support arm to fix said pad in a selected angular position with respect to a generally horizontal plane defined by an upper surface of the work surface, and a second brake which cooperates with said second end of said support arm to fix said pad in a selected vertical position with respect to the work surface.

4. The arrangement of claim 3 wherein said braking assembly includes a pair of cables having first ends fixed to said lever, one of said cables having a second end connected to said first brake and the other said cable having a second end connected to said second brake, wherein upon actuation of said lever said first and second cables are actuated to release said first and second brakes and permit simultaneous vertical and angular adjustment of said pad relative to the work surface.

5. The arrangement of claim 1 wherein said lever has first and second legs which are angled relative to one another to provide said lever with a generally L-shaped configuration, said first leg defining said actuator portion thereon and said actuator portion projecting horizontally outwardly beyond said front edge of said pad, and said second leg projecting beneath said pad and being connected to said cabling.

6. The arrangement of claim 1 including a bracket disposed adjacent the work surface and associated with said second end of said support arm, said bracket non-rotatably mounting thereon a circular member defining a vertical axis, a frame-like arrangement movably disposed within an elongate track fixedly mounted to a lower surface of the work surface, said frame-like arrangement being slidably disposed within said track for permitting movement of said support pad arrangement toward and away from the work surface, and said frame-like arrangement being configured to confine said circular member therewithin such that said circular member is rotatable relative to said frame-like arrangement to permit said support pad arrangement to be pivoted about a vertical axis with respect to the work surface.

7. A support arrangement for connection to a work surface, said arrangement comprising:

a main support pad having sidewardly-spaced first and second edges and defining an upper side thereon adapted for supporting a computer keyboard;

an elongate support element having an arcuately-shaped upper surface, said support element being mounted adjacent a lower side of said main support pad and being slidably supported thereon for movement between a retracted position wherein said support element is disposed substantially beneath said main support pad and an extended position wherein said support element is cantilevered outwardly from one said edge of said main support pad; and an auxiliary support pad defining first and second edges which are sidewardly-spaced from one another, an upper side adapted for supporting a computer accessory thereon, and a lower side defining an arcuately-shaped bearing area which extends transversely therealong, one said edge of said auxiliary support pad mounting thereon a toothed sector which is cooperatively engageable with a corresponding toothed sector mounted on said one edge of said main support pad, said auxiliary support pad being positioned on said support element when in said extended position such that said bearing area engages said upper surface thereof, said auxiliary support pad being slidably movable along said upper surface of said support element to effectively adjust the respective positions of said toothed sectors relative to one another and position said auxiliary support pad in a selected angular orientation relative to said main support pad.

8. The support arrangement of claim 7 wherein said auxiliary support pad mounts thereon a said toothed sector on both said first and second edges thereof, said toothed sector of said first edge of said auxiliary support pad being positioned in adjacent and opposed relation with said toothed sector of said main support pad when said auxiliary support pad is mounted thereon, said support element having a terminal end mounting thereon a toothed sector disposed in adjacent and opposed relation with said toothed sector of said second edge of said auxiliary support pad for cooperative engagement therewith.

9. The support arrangement of claim 8 wherein said terminal end of said support element mounts thereon a handle member for moving said support element between said extended and retracted positions, said handle member incorporating therein said toothed sector of said terminal end.

10. The support arrangement of claim 7 wherein said main support pad mounts thereon a said toothed sector on each said first and second edge thereof and a pair of said support elements are mounted adjacent said lower side of said main support pad, each said support element being selectively slidably extendible outwardly from one of said first and second edges of said main support pad into said extended position to permit said auxiliary support pad to be selectively positioned adjacent either of said first and second edges of said main support pad.

11. The support arrangement of claim 10 wherein said auxiliary support pad mounts thereon a said toothed sector on each said first and second edge thereof and each said support element has a terminal end mounting thereon a toothed sector which is horizontally and vertically aligned with one of said toothed sectors of said main support pad, said toothed sectors of said auxiliary support pad when positioned on one of said support elements adjacent one edge of said main support pad being respectively engaged with said toothed sector mounted on said one edge of said main support pad and said toothed sector of said one support element such that said auxiliary support pad is sandwiched therebetween and locked in a selected angular position relative to said main support pad.

12. The support arrangement of claim 7 wherein said support element defines a generally horizontal pivot axis which extends transversely of said main support pad and said auxiliary support pad, said auxiliary support pad being positionable in a plurality of discrete angular positions about the pivot axis.

13. The support arrangement of claim 7 wherein said auxiliary support pad mounts thereon a said toothed sector on both said first and second edges thereof which are horizontally spaced from one another, said support element having a terminal end mounting thereon a toothed sector aligned with said toothed sector of said main support pad, said support element being extendible into a fully extended position wherein said toothed sector thereof is located slightly horizontally outwardly beyond the position thereof when in said extended position to permit angular adjustment of said auxiliary support pad relative to said main support pad by selectively positioning said toothed sectors of said auxiliary support pad relative to the respective opposed toothed sectors of said main support pad and said support element, said support element being retractable inwardly into said retracted position after angular adjustment of said auxiliary support pad to engage said toothed sectors of said auxiliary support pad with the respective opposed toothed sectors of said main support pad and said support element and fix said auxiliary in a selected angular position.

14. The support arrangement of claim 7 wherein said upper side of said auxiliary support pad defines a generally flat surface for supporting a computer mouse thereon and accommodating movements thereof, and a shoulder projects upwardly from and substantially surrounds said flat surface to confine the mouse on said auxiliary support pad.

15. The support arrangement of claim 14 wherein said auxiliary support pad includes a front edge portion having a generally concave configuration in transverse cross-section and generally convex configuration in longitudinal section.

16. The support arrangement of claim 7 wherein said main support pad includes a shroud which projects horizontally sidewardly from said one edge of said main support pad above said toothed sector thereof, said shroud being disposed to cover the engaged said toothed sectors of said main support pad and said auxiliary support pad.

17. The support arrangement of claim 16 wherein said auxiliary support pad mounts thereon a toothed sector on both said first and second edges thereof, said toothed sector of said first edge being positioned in adjacent and opposed relation with said toothed sector of said main support pad, said support element has a terminal end mounting thereon a handle member for moving said support element between said extended and retracted positions, said handle member defining a toothed sector disposed in adjacent and opposed relation with said toothed sector of said second edge of said auxiliary support pad for cooperative engagement therewith, said handle member further defining a shroud which projects horizontally sidewardly toward said auxiliary support pad and above said toothed sector of said handle member, said shroud of said handle member being disposed to cover the engaged said toothed sectors of said auxiliary support pad and said handle member.

18. The support arrangement of claim 17 wherein said shroud of said handle member is spaced vertically from said toothed sector thereof to define a sidewardly opening space therebetween, said shroud of said main support pad engaging within said space and said toothed sectors of said handle member and said main support pad engaging one another when said auxiliary support pad is not mounted on said support element and said support element is in said retracted position.

19. The support arrangement of claim 7 wherein said upper surface of said support element is convexly-shaped and said bearing area is concavely-shaped.

20. In a support pad arrangement connected to a work surface, the arrangement including a main support pad having sidewardly-spaced first and second sides which are opposite one another, said main support pad defining an enlarged upper surface configured for supporting a computer keyboard thereon, and an auxiliary support pad defining an upper surface for supporting a computer accessory thereon, comprising the improvement wherein first and second elongate beams are mounted adjacent a lower surface of said main support pad in vertically overlapping relation with one another, each said beam being supported on said main support pad for sliding movement relative to the other said beam between a retracted position wherein said beam is disposed substantially beneath said main support pad and an extended position wherein said first beam is cantilevered outwardly from said first side of said main support pad and said second beam is cantilevered outwardly from said second side of said main support pad, said auxiliary support pad being supportable on one of said beams in said extended position thereof to selectively position said auxiliary support pad adjacent one of said first and second sides of said main support pad.

21. The arrangement of claim 20 further including a stop member which cooperates between said lower surface of said main support pad and each said beam to hold same in one of said extended and retracted positions.

22. The arrangement of claim 21 wherein a pair of said stop members are disposed adjacent the respective first and second sides of said main support pad for cooperation with the respective said beams, each said stop member including a boss which projects downwardly from said lower surface and confines therein a downwardly biased ball bearing positioned adjacent an upper surface of a respective said beam, each said beam defining therein a first opening disposed adjacent a terminal outer end thereof and a second opening spaced horizontally inwardly from said first opening such that when said beam is disposed in said extended position said ball bearing engages in said second opening to hold said beam thereat, and when said beam is disposed in said retracted position said ball bearing engages in said first opening to hold said beam thereat.

23. The arrangement of claim 20 wherein each said beam and a lower side of said auxiliary support pad define cooperating arcuate bearing surfaces which are engageable with one another to permit sliding movement of said auxiliary support pad along and relative to a respective said beam to position said auxiliary support pad in a selected angular position relative to said main support pad.

24. The arrangement of claim 23 wherein each said beam has an arcuate transverse cross-section, said beams being slidably secured to said lower surface of said main support pad by a support bracket having a contour similar to said cross-sections of said beams.

25. The arrangement of claim 24 wherein a pair of said support brackets are fixed to said lower surface, said pair of support brackets being respectively mounted adjacent said first and second sides of said main support pad by respective pairs of mounting bosses which project downwardly from said lower surface, one said pair of mounting bosses projecting downwardly beyond the other pair of mounting bosses to support said beams in vertically stacked relation and permit one said beam to slidably ride beneath the other said beam.

26. The arrangement of claim 20 wherein said main support pad mounts an arcuate serrated member on each said first and second side thereof, and said beams each include a terminal outer end defining thereon a handle member for moving the respective beam between said extended and retracted positions, said handle members each defining thereon an arcuate serrated member, said auxiliary support pad mounting thereon a pair of arcuate serrated members on respective first and second sides thereof, all of said serrated members being horizontally and vertically aligned with one another, said serrated members of said auxiliary support pad when same is supported on said one beam being respectively engaged with said serrated member of said one beam and said serrated member on said one side of said main support pad to secure said auxiliary support pad thereto, the opposed pairs of said serrated members being positionally adjustable relative to one another to permit angular adjustment of said auxiliary support pad relative to said main support pad.

27. The arrangement of claim 20 wherein each said beam defines a generally horizontal pivot axis which extends transversely of said main and auxiliary support pads, said auxiliary support pad being slidably movable relative to said one beam to selectively position said auxiliary support pad in one of a plurality of discrete angular positions about the pivot axis.

28. A support pad arrangement for a computer keyboard comprising:

a main support pad having sidewardly-spaced first and second side edges and defining an upper side adapted for supporting a computer keyboard thereon;

a support arm connected to said main support pad for supporting said pad arrangement from a work surface;

an auxiliary support pad defining an upper side for supporting a computer accessory thereon;

an elongate support element mounted on said main support pad adjacent a lower side thereof, said support element being slidably supported on said main support pad for movement between a retracted position wherein said support element is disposed substantially beneath said main support pad and an extended position wherein said support element is cantilevered transversely outwardly from one of said first and second side edges of said main support pad; and an arrangement for mounting said auxiliary support pad on said support element in said extended position thereof, said mounting arrangement including a pair of opposed and cooperative bearing members which are slidably movable relative to one another to permit said auxiliary support pad to be positioned in a selected angular orientation relative to said main support pad.

29. The arrangement of claim 28 wherein said support element defines a generally horizontal pivot axis which extends transversely of said main support pad and said auxiliary support pad, said auxiliary support pad being positionable in a plurality of discrete angular positions about the pivot axis relative to said main support pad by slidably adjusting said bearing members relative to one another, said arrangement further including a locking structure which fixes said auxiliary support pad in said selected angular orientation relative to said main support pad.

30. The arrangement of claim 29 wherein one of said bearing members has a convex configuration and the other said bearing member has a concave configuration.

31. The arrangement of claim 30 wherein one of said bearing members is defined on a lower side of said auxiliary support pad and the other said bearing member is defined on an upper surface of said support element.

32. The arrangement of claim 28 wherein said support element and a lower side of said auxiliary support pad respectively define said cooperative bearing members, said bearing members having arcuate surfaces which are engageable with one another to permit sliding movement of said auxiliary support pad along and relative to said support element to position said auxiliary support pad in said selected angular orientation relative to said main support pad.

33. A support pad arrangement for supporting a computer keyboard, said arrangement comprising:

a main support pad having first and second sidewardly-spaced side edges and defining an upper surface configured for supporting a computer keyboard thereon;

an auxiliary support pad defining an upper surface configured for supporting a computer accessory thereon;

first and second elongate support members each mounted on said main support pad for sliding movement between a retracted position wherein the respective support member is positioned substantially beneath said main support pad and an extended position wherein said first support member is cantilevered transversely outwardly from said first side edge of said main support pad and said second support member is cantilevered transversely outwardly from said second side edge of said main support pad, said auxiliary support pad being selectively mountable on one of said first and second support members to position said auxiliary support pad adjacent the corresponding said first and second side edge of said main support pad.

34. The support pad arrangement of claim 33 wherein said auxiliary support pad is wholly and readily detachable from said main support pad and selectively positionable adjacent either of said first and second side edges thereof by positioning the corresponding said support member in said extended position.

35. The support pad arrangement of claim 33 wherein said first and second support members are mounted on a lower surface of said main support pad in generally parallel relation with one another.

36. The support pad arrangement of claim 33 wherein said support members are mounted for sliding movement in a direction which is transverse to said side edges.

37. A support pad arrangement for a computer keyboard, comprising:

a keyboard support pad having a generally horizontally enlarged upper surface adapted for supporting a computer keyboard thereon;

a supporting structure connected to said keyboard pad for movably supporting said support pad arrangement from a work surface;

a releasable braking assembly cooperating between said keyboard pad and said supporting structure for fixing said keyboard pad in a selected position relative to the work surface; and an actuator member movably mounted on said keyboard pad and connected to cabling of said braking assembly, said actuator member being manually actuable by a user into an actuating position to release said braking assembly and permit simultaneous adjustment of said keyboard pad into a plurality of vertical and angular positions relative to the work surface.

38. The arrangement of claim 37 wherein said actuator member is mounted on said keyboard pad closely adjacent a front free edge thereof and has a portion projecting outwardly from said front edge which is manually depressible by a user to release said braking assembly, said actuator member being disposed and movable within a plane generally parallel to a plane defined by said upper surface.

39. The arrangement of claim 37 further including an auxiliary support pad having a generally horizontally enlarged upper surface adapted for supporting a computer accessory thereon, and a connecting structure configured to selectively and detachably connect said auxiliary pad to said keyboard pad adjacent either of first and second sides thereof.

40. The arrangement of claim 39 wherein said connecting structure includes a pair of elongate support elements each slidably supported on said keyboard pad, a first of said support elements being extendible outwardly from said first side of said keyboard pad into an extended position, and a second of said support elements being extendible outwardly from said second side of said keyboard pad into an extended position, the respective support elements being selectively movable into said extended position for supporting said auxiliary pad adjacent the respective said first or second side of said keyboard pad.

41. The arrangement of claim 40 wherein said first and second support elements are longitudinally aligned with one another and are slidably mounted on a bottom surface of said keyboard pad.

42. The arrangement of claim 39 wherein first and second connecting members are mounted adjacent said first and second sides of said keyboard pad, respectively, and a third connecting member is mounted on said auxiliary pad and is configured to cooperatively engage with one of said first and second connecting members to permit said auxiliary pad to be pivoted about a generally horizontal axis into a plurality of discrete angular positions relative to said keyboard pad.

43. The arrangement of claim 42 wherein each said first and second connecting member includes a toothed portion configured to engage with a correspondingly configured toothed portion of said third connecting member.

* * * * *